SELF-SYNCHRONIZING READOUT WITH LOW FREQUENCY COMPENSATION

Filed Oct. 5, 1965

INVENTOR.
GEORGE V. JACOBY
BY John T. O'Halloran
Attorney

INVENTOR.
GEORGE V. JACOBY
BY
John T. O'Halloran
Attorney

INVENTOR.
GEORGE V. JACOBY
BY John T. O'Halloran
Attorney

United States Patent Office 3,441,921

Patented Apr. 29, 1969

3,441,921

SELF-SYNCHRONIZING READOUT WITH LOW FREQUENCY COMPENSATION

George V. Jacoby, Bala-Cynwyd, Pa., assignor to Radio Corporation of America, a corporation of Delaware Filed Oct. 5, 1965, Ser. No. 493,132
Int. Cl. G11b 5/00
U.S. Cl. 340—174.1 5 Claims

ABSTRACT OF THE DISCLOSURE

The low frequency components in the readback signal are boosted to correct for the attenuation that occurs during the readback process. The boosting is accomplished by extracting from the readback signal the low frequency components thereof so as to provide a correction signal. The correction signal is then added back iinto the initial readback signal.

This invention relates to readback arrangements for information storage systems, and more particularly relates to circuits which function to equalize readback signals.

One type of recording that is frequently utilized when it is desired to densely pack binary information on a polarizable storage medium (e.g. magnetic or dielectric tapes, drums, etc.) is phase recording. In this type of recording, two recording levels of write signals of opposite polarity are used to record each binary information bit. For example, a binary 1 is recorded by applying a first recording level to polarize the storage medium in one direction and then a second recording level to polarize the medium in the opposite direction. Similarly, a binary 0 is recorded by applying said second recording level to polarize the medium in the said opposite direction and then applying said first recording level to polarize the medium in the said one direction. With this type of recording each bit cell in the storage medium is polarized in two opposite directions, with a change in direction or transition in polarization occurring in the approximate center of the bit cell. A transition in polarization also occurs at the end of each cell when a succession of binary 1's (or binary 0's) are recorded but no transition occurs when a binary 1 is recorded immediately after a binary 0, and vice versa. During feedback, a readback pulse is produced by each transition in polarization and therefore each stored information bit produces a readback pulse. The polarity of the pulses denotes the binary value of the stored information signals.

The full advantage of phase recording is not obtained unless the inherent timing contained in the readback signal is utilized. The peaks of the bipolar pulses in a readback signal, or the zero amplitude crossovers bracketing these pulses, are inherently related to the transfer of the binary information from the storage medium and may be utilized to generate clock pulses in synchronism with this transfer. The generation of such a self-synchronizing clock signal avoids the necessity of providing either a separate timing track on the storage medium or an external clock signal generator.

A problem does arise, however, in generating a self-synchronizing clock signal because the low and high frequency components of the readback signal at high packing densities are so severely attenuated, due to the poor frequency response of the read heads, that reliable signal peaks or zero crossovers are not present in the readback signal. Circuits have been heretofore provided to compensate for the poor high frequency response of the reading heads. However, it has been found that the absence of compensation for the low frequency response of the reading heads causes a timing error in the synchronizing signal.

Accordingly, it is an object of this invention to provide an improved readback system including a low frequency compensating circuit.

It is another object of this invention to provide an improved readback system including an equalizing circuit which restores the low frequency signal components initially contained in a recording signal.

A readback system according to the invention includes a compensating circuit that boosts the low frequency components in a readback signal in which the high frequency components have been previously restored. This is accomplished by extracting the low frequency components from a readback signal and then adding these components back into an initial readback signal to provide the low frequency boost. The boosting of the low frequency components equalizes the amplitudes of the bipolar pulses in the readback signal as well as equalizers the zero crossovers bracketing these pulses and permits an accurate clock signal to be generated therefrom.

In a preferred embodiment of the invention, the boosting is accomplished by delaying the readback signal for a predetermined time to shift the phase thereof. The delayed readback signal is then algebraically added to the initial readback signal to provide a correction signal containing substantially only low frequencies. The correction signal is then added to the initial readback signal to boost the low frequency components therein.

Figure 1:
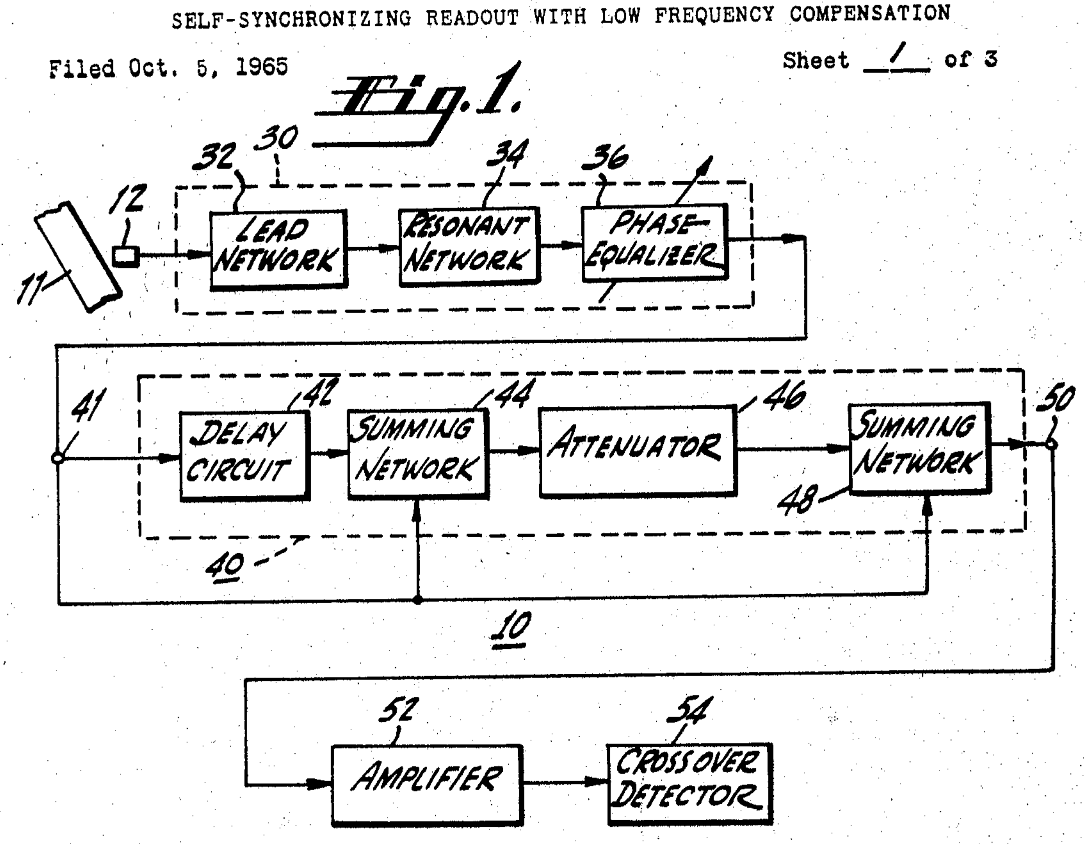
FIGURE 1 is a block diagram of a readback system embodying the invention.

Referring now to FIGURE 1, a readback system 10 includes a polarizable storage medium 11. The medium 11 may, for example, be of the dielectric or magnetic type and may consist of a drum, a tape, etc. For the purposes of this specification, it will be assumed that the polarizable storage medium 11 is a magnetic tape. The binary information previously stored on the tape 11 is read out by means of a magnetic transducer or read head 12. The information stored on the magnetic tape 11 may be recorded thereon by a phase modulated write current signal 13, such as that shown in line *a* of FIGURE 2. The binary data stored on the tape 11 by the recording signal 13 is assumed to comprise the sequence 11100011100.

It is to be noted that each information bit in the recording signal 13 is recorded by two opposite polarity recording levels of write current. To record a binary 1 a first negative recording level is applied to polarize the tape 11 in one direction and then a second positive recording level is applied to polarize the tape 11 in the opposite direction. An opposite sequence of recording levels is utilized to record a binary 0. Consequently, a bit cell in which a binary 1 is recorded exhibits a negative to a positive transition in polarization. Such a transition is represented in line *a* of FIGURE 2 by an arrowhead pointing to the top of the figure. A bit cell in which a binary 0 is recorded exhibits a positive to a negative transition in polarization. Such a transition is represented by an arrowhead pointing to the bottom of FIGURE 2. In the recording signal 13, a succession of either binary 1's or 0's exhibit a half period of wavelength of value $T_1$ which is one-half the value of a half period of wavelength $2T_1$ for a 0 to 1 or a 1 to 0 pattern change. This is because a succession of either binary 1's or 0's requires that the signal 13 return to the same level to record each successive information bit whereas the 0 to 1 or 1 to 0 pattern changes do not. Thus, the recording signal 13 exhibits two distinct periods therein. Throughout the specification the fundamental frequency of the pulses of the first half period $T_1$ is designated $f_o$ whereas the fundamental frequency of the pulses of the second half period $2T_1$ is designated $f_{o/2}$. Information is read out of the tape 11 at the frequency $f_o$ and it is desired to generate a clock signal at this frequency so as to provide a timing signal to transfer the binary information at the correct rate.

In addition to the higher frequencies $f_o$ and $f_{o/2}$, the recording signal 13 also includes low frequency components. The low frequencies occur because of the pattern changes when the signal 13 changes from a series of binary 1's to a series of binary 0's and vice versa; as well as changing from a series of 1's or 0's to a series of alternate 1's and 0's, and vice versa. This may be seen from FIGURE 2*b* wherein the integral 14 of the recording signal 13 is shown. If there were no pattern changes in recording signal 13, the integral 14 would be balanced about the zero axis because a series of binary 1's, or alternatively a series of binary 0's, in the recording signal 13 exhibit equal positive and negative areas. However, when a pattern change occurs, the areas are no longer equal and the integral 14 reflects these unequalities. Thus, there are low frequency components existing in the recording signal 13 notwithstanding the fact that the fundamental frequencies $f_o$ and $f_{o/2}$ of the half period pulses therein are essentially high frequencies. The recognition of the existence of the lower frequency components in the recording signal 13 and their reintroduction into a readback signal permits the generation of an accurate self-synchronizing clock signal.

Figure 3:
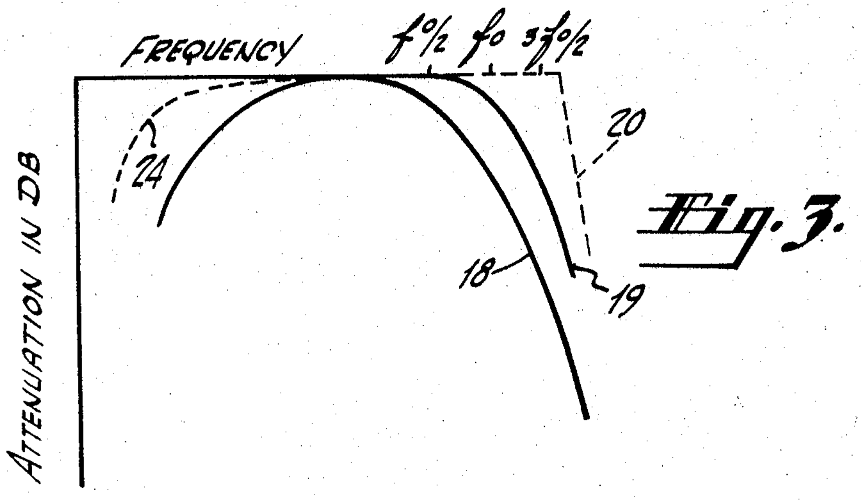
FIGURE 3 is a graph illustrating the frequency response of the reading heads utilized in the system of FIGURE 1; and, FIGURES 4 and 5 are schematic circuit diagrams of other embodiments of the invention.

In readback, the relative motion between the magnetized tape 11 and the read head 12 induces a readback voltage in the read head 12. At high packing densities the "raw" readback signal may be similar to the signal 15 in line *c* of FIGURE 2. The raw signal 15 is so severely attenuated and distorted that neither the bipolar pulses nor the zero crossovers in this signal are distinct enough to produce either reliable information or an accurate self-synchronizing clock signal. The readback signal 15 is attenuated because of the frequency response of the read head 12. As shown in FIGURE 3 by the curve 18 (a plot of attenuation vs. frequency), the read head severely attenuates both the low and the high frequency components of the recorded signal. The readback signal 15 is distorted because the readback process is essentially a differentiation process, which process introduces quadrantal phase shifts into the different frequency components of the recorded signal.

The readback system 10 includes a high frequency compensating and equalizing network 30 coupled to the transducer 12 to convert the raw signal 15 into an initial readback signal as shown by the curve 16 in FIGURE 2*d*. Such a signal 16 is a substantial replica of the recording signal 13. By providing a substantial replica of the recording signal 13, the compensating circuit 30 approximately duplicates the regularity of the zero crossovers in the recording signal 13 to permit the generation of a self-synchronizing clock signal therefrom. The high frequency compensating circuit 30 is fully described in a copending patent application entitled, "Readback Circuits for Information Storage Systems," for George V. Jacoby and Joseph D. Gleitman, filed Mar. 3, 1965, Ser. No. 436,764, ow U.S. Pat. No. 3,405,403, and assigned to the same assignee as the present invention.

Briefly, the compensating circuit 30 boosts the high frequency components in the raw readback signal 15 and also quadrantally phase shifts these components. This phase shift is in addition to the quadrantal phase shift produced by the read head 12 and provides an initial readback signal 16 that is out-of-phase with the recording signal 13 but which is a substantial replica of this signal. A mirror image 17 of the recording signal 13 is superimposed, in dotted form, over the readback signal 16 to show this substantial duplication.

The high frequency compensating circuit 30 includes a lead network 32 that boosts the high frequency components in the raw signal 15 as well as introduces the quadrantal phase shift into this signal. The lead network 32 improves the overall frequency response to provide the response shown by the curve 19 in FIGURE 3. A resonant network 34 is coupled to the lead network 32 to improve the high frequency response to that shown by the dotted line 20 in FIGURE 3. A phase equalizer 36, which is variable as shown in FIGURE 1 by the arrow therethrough, is coupled to the resonant network 34 to be adjusted to counteract the phase shift introduced by the resonant network 34.

Figure 2:
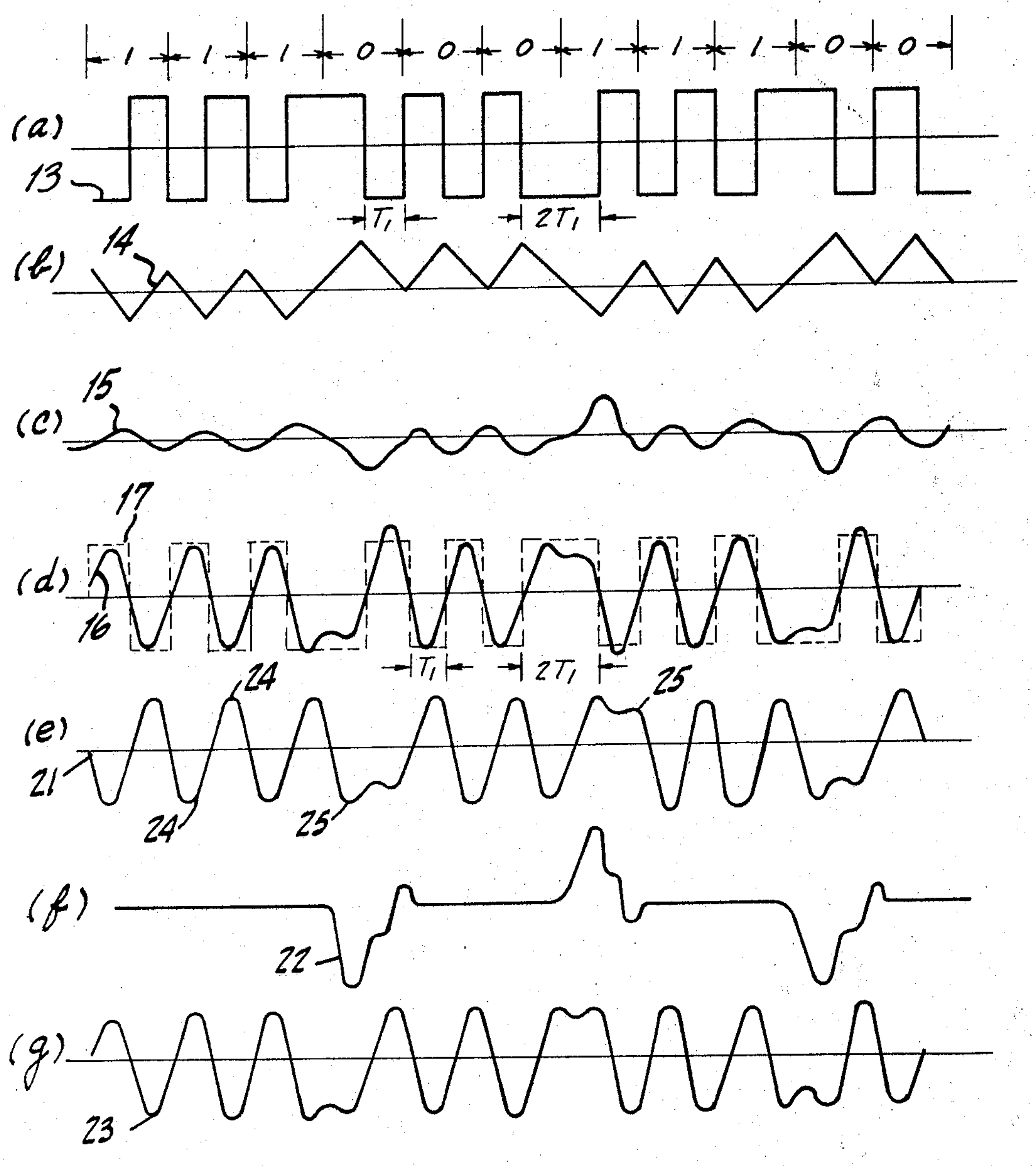
FIGURE 2 is a series of graphs, somewhat idealized, that depict the waveforms that occur at various points in the readback system of FIGURE 1.

The output of the high frequency circuit 30, the signal 16, is a substantial replica of the initial recording signal 13 but exhibits distortions wherever a pattern change occurs. Thus, the pulses of the second half period $2T_1$ which occur only when the pattern changes exhibit double peaks that are unequal. The second peak in every double peaked waveform is slightly less in amplitude than the first peak and the succeeding pulse of the first half period $T_1$ is larger in amplitude than the adjacent pulses of the same half period. The reason for this distortion is that the low frequency components originally occurring in the recording signal 13 are substantially absent from the initial compensated signal 16. To reintroduce the low frequency components into the initial signal 16, a low frequency compensating circuit 40 is incorporated into the readback system 10. The low frequency compensating circuit includes an input terminal 41 to which the initial readback signal 16 is applied. A delay line 42 is coupled to the terminal 41 to introduce a time delay substantially equal to the first half period $T_1$. The delayed readback signal, the signal 21 in line *e* of FIGURE 2, is applied to a first summing network 44. The summing network 44 is also coupled to the input terminal 41 to receive the initial recording signal 16. The delayed readback signal 21 is algebraically added to the initial readback 16 to produce a correction signal 22 as shown in the line *f* of FIGURE 2.

The correction signal 22 is attenuated in an attenuator 46 and the attenuated correction signal is applied to a second summing network 48 along with an initial readback signal 16 from the input terminal 41. The output of the summing network 48 is derived from the output terminal 50 and comprises a readback signal 23 as shown in line *g* of FIGURE 2. The final readback signal 23 is equalized for both the high and low frequency components originally occurring in the recording signal 13. The final readback signal 23 is amplified in an amplifier 52 and applied to a crossover detector 54. The crossover detector 54 extracts accurate timing pulses from the zero crossovers in the finally equalized signal 23.

In operation, the raw readback signal 15 derived from the transducer 12 is equalized to the extent indicated by the signal 16 in FIGURE 2 by the high frequency compensating circuit 30. However, the absence of the low frequency components in the waveform 16 causes unequal zero crossovers whenever the pattern changes from a series of binary 1's to 0's, etc. This is evidenced by the unequal peaks in the pulses of the second half period $2T_1$. By equalizing these peaks, the low frequency components occurring in the original recording signal 13 are reintroduced into the readback sigal. To equalize the peaks in the second half period pulses, a delayed readback signal 21 is derived from the delay circuit 42 in the low frequency compensating circuit 40. The delay introduced is substantially equal to the half period $T_1$. Thus, the delayed readback signal 21 exhibits first half period pulses, i.e. the pulses 24 in line *e* of FIGURE 2, that are completely out-of-phase with corresponding first half period pulses in the initial readback signal 16. However, the second half period pulses, i.e. the pulses 25 in line *e* of FIGURE 2, are not completely out-of-phase with corresponding pulses in the initial readback signal 16. Consequently, when the delayed readback signal 21 and the initial readback signal 16 are algebraically added together in the first summing network 44, the first half period pulses substantially cancel each other whereas the second half period pulses do not. The resultant correction signal 22 includes substantially only pulses occurring at low frequency or at a low repetition rate. Undesired high frequency components in the correction signal 22 may be removed by coupling a suitable capacitor from the output of the first summing network 44 to circuit ground in the system 10 to filter out these high frequency components. The correction signal 22 is attenuated in the attenuator 46 to reduce the amplitude of the pulses therein. It is to be noted from FIGURE 2 that the correction signal 22 pulses are substantially aligned with the second or smaller peaks of the second half period pulses in the initial readback signal 16, line *d* of FIGURE 2. Consequently, when an attenuated correction signal 22 is algebraically added in the second summing network 48 to the initial readback signal 16, the smaller peak in each second half period pulse is equalized with the upper peak therein. Thus, a final readback signal 23 is provided wherein both the high frequency and the low frequency components originally appearing in the recording signal 16 have been reintroduced. The final signal 23 is equalized about the zero axis and provides regularly occurring zero crossovers from which accurate timing pulses may be generated.

Figure 4:
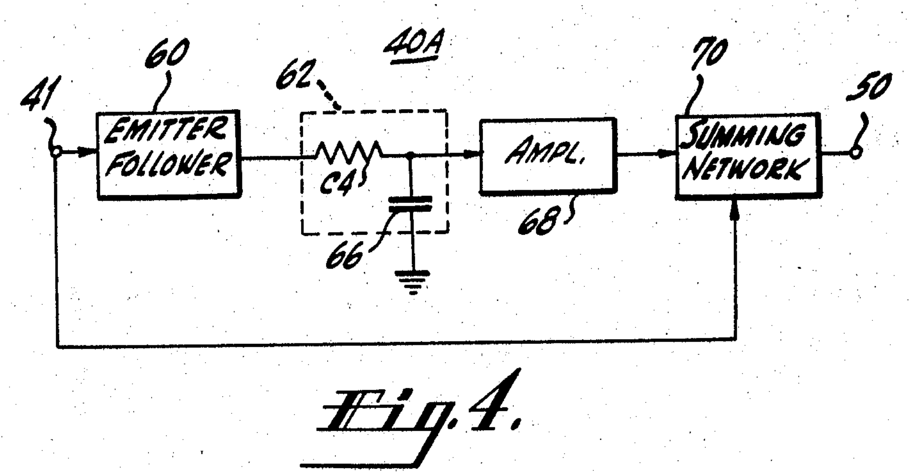

Referring now to FIGURE 4, there is illustrated another embodiment of the invention. In this embodiment of the invention, a low frequency compensating circuit 40A includes an emitter follower 60 that is coupled to the input terminal 41 to isolate an integrating circuit 62 from the high frequency compensating circuit 30 of FIGURE 1. The integrating circuit may, for example, comprise a series resistor 64 and a shunt capacitor 66. Such an R-C integrating circuit 62 is essentially a low-pass filter. The integrator 62 output is amplified in an amplifier 68 and then applied to a summing network 70 along with an initial readback signal applied from the input terminal 41. The summing network 70 may, for example, be identical to the networks 44 and 48 in FIGURE 1.

In operation, the emitter follower 60 isolates the integrating circuit 62 from the high frequency compensating circuit 30 so that the time constant of the circuit 62 is not changed. The integrator 62 exhibits a long time constant as compared with the period $T_1$. The integrator 62 integrates the initial readback signal 16 to extract the low frequency components from the signal 16. The low frequency components are then amplified in the amplifier 68 and algebraically added to an initial readback signal 16 in the summing network 70 to effectively boost the low frequency components therein. Thus, as shown in FIGURE 3 by the curve 24, the frequency response of the readback system is extended to reintroduce low frequency components back into the final readback signal.

Figure 5:
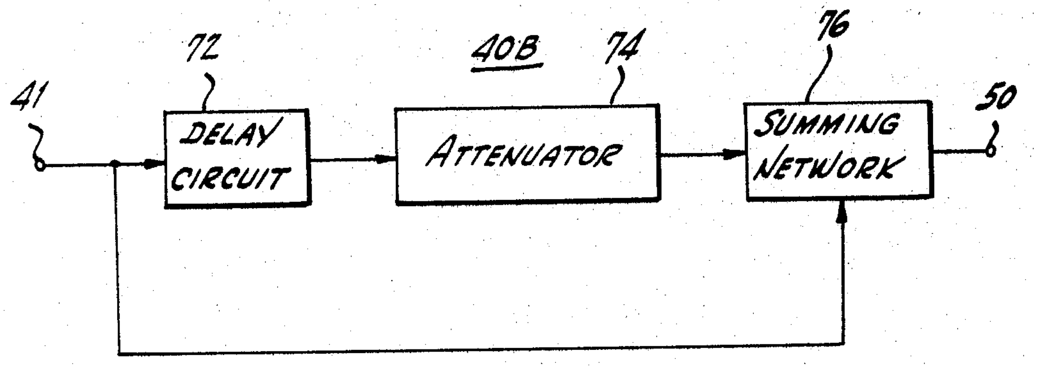

Referring now to FIGURE 5, another embodiment of a low frequency compensating circuit 40B is shown. The compensating circuit 40B includes a delay line 72 which is substantially identical to the delay line 42 in FIGURE 1 and introduces a time delay equal to the half period $T_1$ into a signal applied to the input terminal 41. The delayed wave derived from the delay circuit 72 is attenuated in an attenuator 74 and applied to a summing network 76 along with the input signal applied from the input terminal 41. The summing network 74 may, for example, be identical to the networks 44 and 48 in FIGURE 1. The operation of the embodiment of the invention in FIGURE 5 is similar to that in FIGURE 1. However, the input signal applied to the input terminal 41 of the circuit 40B is first pre-distorted by the phase equalizer 36 in the high frequency compensating circuit 30 to accentuate the differences between the double peaks in a pulse having the period $2T_1$. Thus, when the delayed wave is attenuated, a residue of the higher peak remains to be added to an initial readback signal to equalize these peaks.

Thus, in accordance with the invention, a low frequency compensating circuit is provided which equalizes the zero crossover points in a readback signal derived from a phase modulated recorded signal. The low frequency compensating circuit permits an accurate timing synchronizing signal to be extracted from the readback signal.

What is claimed is:

1. In a readback system that reads back information signals recorded on a storage medium by a rectangular recording signal that includes pulses of first and second half periods of wavelength and a plurality of low and high frequency signal components, said readback system including means for producing a bipolar readback signal wherein said high frequency signal components are boosted more than said low frequency signal components, the combination comprising, means for extracting said low frequency signal components from said readback signal, and means for adding said extracted low frequency signal components into an initial readback signal so as to equalize the amplitude of both the low and the high frequency signal components in said initial readback signal.

2. In a readback system that reads back information signals recorded on a storage medium by a rectangular recording signal that includes pulses of first and second half periods of wavelength and a plurality of low and high frequency signal components, said readback system including means for producing a bipolar readback signal having said high frequency signal components boosted more than said low frequency signal components, the combination comprising, means for integrating said readback signal to extract said low frequency signal components therefrom, and means for adding said extracted low frequency signal components into an initial readback signal to boost the amplitude of the low frequency signal components in said initial readback signal.

3. In a readback system that reads back information signals recorded on a storage medium by a rectangular recording signal that includes pulses of first and second half periods of wavelength and a plurality of low and high frequency signal components, said readback system including means for producing a bipolar readback signal wherein said high frequency signal components are boosted more than said low frequency signal components, the combination comprising, means for filtering the low frequency components out of said readback signal, means for amplifying said low frequency component signals, and means for adding said amplified low frequency component signals into an initial readback signal to boost the amplitude of the low frequency portions of said initial readback signal.

4. In a readback system that reads back information signals recorded on a storage medium by a rectangular recording signal that includes pulses of first and second half periods of wavelength, said readback system including means for producing a bipolar readback signal having pulses corresponding to said first and second half periods, the combination comprising, a delay circuit for delaying said readback signal for a time delay substantially equal to said first half period so as to produce a delayed readback signal having pulses of said first half period out-of-phase with corresponding first half period pulses in an initial readback signal, means for adding said delayed readback signal to said initial readback signal to produce a correction signal substantially devoid of pulses of said first half period and having pulses of said second half period partially cancelled, means for attenuating said correction signal, and means for adding said correction signal to said initial readback signal to boost the amplitude of portions of said second half period pulses.

5. In a readback system that reads back information signals recorded on a storage medium by a rectangular recording signal that includes pulses of first and second half periods of wavelength, said readback system including means for producing a bipolar readback signal having pulses corresponding to said first and second half periods, the combination comprising, a delay circuit for delaying said readback signal for a time delay substantially equal to said first half period so as to produce a delayed readback signal having pulses of said first half period out-of-phase with corresponding first half period pulses in an initial readback signal, a first summing network coupled to said delay circuit, means for applying said initial readback signal to said first summing network to algebraically add to said delayed readback signal to produce a correction signal substantially devoid of pulses of said first half period and having pulses of said second half period partially cancelled, an attenuator coupled to said first summing network for attenuating said correction signal, a second summing network coupled to said attenuator, and means for applying said initial readback signal to said second summing network to add to said correction signal to boost the amplitude of portions of said second half period pulses.

References Cited

UNITED STATES PATENTS

| | | | |
|---|---|---|---|
| 2,972,735 | 2/1961 | Fuller et al. | 340—174.1 |
| 3,164,815 | 1/1965 | Applequist | 340—174.1 |
| 3,243,580 | 3/1966 | Welsh | 340—174.1 |
| 3,271,750 | 9/1966 | Padalino | 340—174.1 |

BERNARD KONICK, *Primary Examiner.*

VINCENT P. CANNEY, *Assistant Examiner.*